United States Patent
Burrell

(10) Patent No.: US 6,952,702 B2
(45) Date of Patent: Oct. 4, 2005

(54) APPARATUS AND METHODS FOR MANAGING THE DISPLAY OF SMBIOS DATA RELATING TO THE CONFIGURATION AND COMPONENTS OF A COMPUTING SYSTEM

(75) Inventor: Brandon Mitchell Burrell, Suwanee, GA (US)

(73) Assignee: American Megatrends, Inc., Norcross, GA (US)

( * ) Notice: Subject to any disclaimer, the term of this patent is extended or adjusted under 35 U.S.C. 154(b) by 255 days.

(21) Appl. No.: 09/977,760

(22) Filed: Oct. 15, 2001

(65) Prior Publication Data

US 2003/0145008 A1 Jul. 31, 2003

(51) Int. Cl.[7] ............................................. G06F 17/00
(52) U.S. Cl. .................. 707/101; 707/102; 707/103 R; 707/104.1
(58) Field of Search ................... 707/1–10, 100–104.1, 707/200–206; 711/200–221

(56) References Cited

U.S. PATENT DOCUMENTS

| | | |
|---|---|---|
| 4,870,610 A | 9/1989 | Belfer |
| 5,043,919 A | 8/1991 | Callaway et al. |
| 5,065,343 A | 11/1991 | Inoue |
| 5,157,606 A | 10/1992 | Nagashima |
| 5,255,361 A | 10/1993 | Callaway et al. |
| 5,416,903 A | 5/1995 | Malcolm |
| 5,504,922 A * | 4/1996 | Seki et al. ..................... 703/25 |
| 5,682,529 A | 10/1997 | Hendry et al. |
| 5,878,248 A | 3/1999 | Tehranian et al. |
| 5,903,894 A | 5/1999 | Reneris |
| 5,913,040 A | 6/1999 | Rakavy et al. |
| 5,923,844 A | 7/1999 | Pommier et al. |
| 6,009,520 A | 12/1999 | Gharda |
| 6,046,742 A | 4/2000 | Chari |
| 6,122,732 A | 9/2000 | Ahuja |
| 6,323,873 B1 * | 11/2001 | Liebenow .................... 345/619 |
| 6,629,192 B1 * | 9/2003 | Schaefer et al. ............ 711/103 |

OTHER PUBLICATIONS

U.S. Appl. No. 09/686,402, filed Oct. 10, 2000, Burrell.
U.S. Appl. No. 09/685,313, filed Oct. 10, 2000, Burrell.
*System Management BIOS Reference Specification* (previously known as Desktop Management BIOS Specification); Version 2.3; pp. 97; Aug. 12, 1998.

\* cited by examiner

*Primary Examiner*—Jean M. Corrielus
*Assistant Examiner*—Isaac M. Woo
(74) *Attorney, Agent, or Firm*—Alston & Bird LLP

(57) ABSTRACT

The present invention provides apparatus and methods for managing the display of data stored in a SMBIOS database. The apparatus and methods provide a template file intermediate between a SMBIOS utility program and a SMBIOS database. The template file includes all information required for interpreting and displaying the data structures stored in the SMBIOS database. The information in the template file is in the form of structure definitions including descriptor keys for describing the structure of the data and text to be displayed and control keys used by the utility program to navigate the template file. In operation, when commanded, the utility program retrieves data from the SMBIOS database, and using the Type and offset associated with the data, accesses information corresponding to Type and offset from the template file. Using the information from the template file, the utility program properly interprets and the displays to a user the requested information.

30 Claims, 1 Drawing Sheet

APPARATUS AND METHODS FOR MANAGING THE DISPLAY OF SMBIOS DATA RELATING TO THE CONFIGURATION AND COMPONENTS OF A COMPUTING SYSTEM

FIELD OF THE INVENTION

The present invention relates generally to apparatus and methods for display of SMBIOS data relating to the configuration and components of a computing system. More particularly, the present invention relates to a template file that contains information used by a utility program to interpret and display data retrieved from an SMBIOS database.

BACKGROUND OF THE INVENTION

Most of today's computing systems are complex with several different hardware and software components. Further, each of these hardware and software components for each computing system may have different settings or may be manufactured and provided by different vendors from that of another computing system. Also, each computing system may include different versions of the same hardware and software, depending on when they were manufactured. As such, even though a company may purchase all of their computing systems from the same manufacture, each of the individual computers may have varying differences in terms of hardware and software components, as well as the settings associated with these components.

Many companies maintain a computer network consisting of several individual computing systems used by different individuals in the company and managed by an information technology (IT) department. The IT department, in addition to performing general maintenance on the computing systems, will also typically upgrade hardware components and software in the computing systems on a periodic basis. The varying configurations and components of each individual computing system within the network can, however, cause an administrative burden on the maintenance program of an IT department, especially where there are a large number of computing systems in the network.

Desktop Management Interface (DMI) software, now known as System Management Basic Input Output System software (SMBIOS), have been developed to aid system administrators in determining the particular configurations of an individual computing system. Using SMBIOS, the IT department may obtain a wide variety of information concerning the computing system, such as the types of hardware, capabilities, operational status, installation date, etc. Specifically, SMBIOS includes a database of SMBIOS data structures each related to the configuration and components of the computing system. This database typically includes data concerning the computing system from port and slot configurations, processor and memory information, battery and power source indications, to even information concerning chassis configuration.

The information is typically separated into different Type structures, where each Type contains information concerning a certain aspect of the computing system. Currently, there are 128 defined data structure Types in the SMBIOS database that describe various hardware, software, and setting of a computing system. Each Type is further divided into offsets, called Fields, where each Field provides information concerning a particular aspect of the subject component. The data in each Field of each Type may be formatted in a variety of different methods, from simple raw data values to more complex values such as bit fields that provide a wide variety of information based on the individual bit settings.

To interface with this database, SMBIOS requires the use of a utility program. The utility program receives commands from a user and based on these commands, accesses the database and retrieves and displays the desired information from the database to IT personnel. In conventional SMBIOS systems, the database typically only includes the data structures. The information for interpreting and properly displaying these data structures, on the other hand, is typically resident in the source code of the utility program. Specifically, conventional SMBIOS utility programs include all of the strings, field descriptions, bit definitions, etc. hard coded in the utility program for interpreting and displaying the data structures stored in the SMBIOS database.

As an example, the SMBIOS database includes data structure Types which are further organized into data Fields. These Fields may have raw data values indicating information such as memory speed, processor clock speed, etc. To properly display these data Fields when queried by the user, the utility program must not only retrieve the data from the database, but it must also know the data Type's structure, such as whether the current Field data is raw data, a string, bit field, etc. It must also know what format to display the data, (e.g., decimal, binary, hexadecimal, etc.), and provide text describing the data to the user and the units in which the data is displayed.

In a conventional SMBIOS system, all of this information is typically programmed into the source code of the utility program. As such, if the utility is commanded to provide the clock speed of the processor, it will first access the SMBIOS database for this value. The utility will then use definition structures located in the utility program to determine what format the value should be displayed, (for the clock speed it would be decimal), units to display with the value, (Mhz), and text to be displayed to indicate to the user that this value represents the clock speed of the processor.

As with most software programs, the data structures in the SMBIOS database are frequently revised creating new versions of the database. Unfortunately, for each new version of the database, the utility program must also be updated so that data structures in the SMBIOS database can be properly interpreted and displayed. Creating different versions of the utility program is somewhat disadvantageous, as it creates yet another category of differences between individual computing systems. Some computing systems may have one version of the SMBIOS database, while others have a different version. As such, the system administrator must ensure that the proper version of the utility program is installed in the computing system to match the version of the SMBIOS database.

Further, the utility program also includes software code used to operate the utility that is not related to the code used in interpreting and displaying data from the SMBIOS database. As the data used for interpreting and displaying the data in the data structures of the database may be altered for different versions of the SMBIOS database, there is a risk that the non-related code may be overwritten, deleted, or otherwise corrupted during update of the utility program, thereby creating inadvertent bugs in the new version of the utility.

SUMMARY OF THE INVENTION

The present invention provides apparatus and methods for managing the display of data stored in a SMBIOS database. The apparatus and methods of the present invention overcome many of the deficiencies described above with regard to conventional SMBIOS programs. Specifically, the apparatus and methods of the present invention provide a template file intermediate between the utility program and database of SMBIOS. The template file includes all information required for interpreting and displaying the data structures stored in the SMBIOS database. In this regard, when the utility is commanded to retrieve and display data from the SMBIOS database, it retrieves the data from the SMBIOS database. Based on the Type and offset associated with the data, the utility program accesses the corresponding information for interpreting and displaying the data from the template file. Using this information, the utility program then properly interprets and the displays the requested information concerning the computing system.

Importantly, because the information for interpreting and displaying the data stored in the SMBIOS database is removed from the source code of the utility program and placed in the template file, updates to this information is performed in the template file, as opposed to the utility program's source code. Thus, as the SMBIOS database is updated to new versions, the utility program does not necessarily require updating. Instead, updates for interpreting and displaying can be performed in the template file and new versions of the template file created. In this regard, the utility program and all versions of the template file may be stored in the computing system. The utility program will determine the version of the SMBIOS database resident in the computing system and select the corresponding template file version to interpret and display data stored in the SMBIOS database. As such, all of the computing systems within a network will use the same version of the utility program, but their utility programs will individually select the proper version of the template file to use with the corresponding version of the SMBIOS database.

As an example, in one embodiment, the present invention provides a system management apparatus for retrieving and displaying SMBIOS data relating to the configuration and components of a computing system to a user via a display terminal. The apparatus includes a database of SMBIOS structures stored on a computer-readable medium. Each structure is divided into offsets called Fields, where each Field contains data related to a particular aspect of the configuration of the computing system or components of the computing system. Further, the apparatus includes a utility program stored on a computer-readable medium, which in response to commands from a user, retrieves data from the SMBIOS database and displays the data on the display terminal. Importantly, the apparatus also includes a template file stored on a computer-readable medium separate from the utility. The template file contains information for interpreting and displaying the data retrieved by the utility program from the database. As such, the template file eliminates the requirement that the utility program include all of the strings, field descriptions, bit definitions, etc. for interpreting and displaying the data stored in the SMBIOS database.

With regard to the configuration of the template file, data is stored in the SMBIOS database in various manners. For example, data may be stored as raw data values, strings, free form strings, enumerated values, bit fields, or grouped bits. The information for determining the data's structure, its content, and any descriptive text associated with the data is stored in the template file. In operation, the utility program, using parsing routines and standard SMBIOS calls retrieves data from the SMBIOS database. The utility program then uses the template file to determine the structure of the data and what information the data provides, based on the Type and offset associated with the data as stored in the SMBIOS database. The utility then displays the interpreted data along with related text information to the user.

To interpret the data structures stored in the database, the template file of the present invention includes several different types of descriptor keys. These descriptor keys describe the purpose of a particular offset, or Field, in an SMBIOS data structure stored in the SMBIOS database. For example, one descriptor key referred to as DATA_ID is used to inform the utility that the data stored in the Field and associated with the descriptor key is raw data. Examples of raw data values are clock speeds, memory speeds, handles, etc associated with the computing system. The DATA_ID descriptor key includes information relating to the length of the data field and the format for displaying the raw data, such as hexadecimal, decimal, etc. The DATA_ID descriptor key also includes text to accompany the data when displayed. For each raw data Field in a particular structure Type in the SMBIOS database, the template file includes a corresponding Field definition that uses the DATA_ID descriptor key to define the structure of the offset and provide text to be displayed with the data.

In some instances, the data stored in the SMBIOS database are text strings. For this type of data, the template file of the present invention includes a descriptor key, referred to as STRING_ID, indicating to the utility program that the data for the current Field in the Type data structure retrieved by the utility program is a string. The STRING_ID descriptor key, in addition to identifying the data as a string, also includes text to be displayed with the string, thereby providing additional information concerning the contents of the string. For example, if a string Field in an SMBIOS structure defines the name of the vender for the BIOS software, the template file of the present invention will include a STRING_ID descriptor key associated with this Type and offset in the SMBIOS database. The STRING_ID descriptor key will indicate that the data is a string. It will also include text associated with the descriptor key such as "BIOS Vender's Name" to be displayed with the data string for the BIOS vender's name.

Bit field structures may also be used in the database, where the individual bits of the bit field represent yes/no or true/false states about, features, components, or settings within the computing system. For example, associated with each bit in a bit field may be a setting for a particular component of the computing system. If the bit is set to true, then the setting is true of the component, but if set to false, it is not true. For these bit field structures, the template file of the present invention includes a BIT_FIELD_ID descriptor key. The BIT_FIELD_ID descriptor key first identifies the Field stored in the SMBIOS database as a bit field and will provide parameters for interpreting the bit field. It also provides text to be printed describing the contents of the bit field, as well as text to be displayed depending on whether a bit in the bit field is a 1 or a 0. It also includes text to be displayed for each bit describing what the bit represents.

Enumerated values may also be present in the SMBIOS database, where different values represent different features, components, or settings within the computing system. Specifically, one possible value of the enumerated value is one setting, while another possible value represents another setting. For this type of data structure, the template file includes a corresponding descriptor key referred to as ENUM_ID. The ENUM_ID key includes different text to be displayed based on the value of the enumerated value, such that depending on the value of the enumerated value appropriate text will be displayed to the user. In this embodiment, the utility program initially retrieves the enumerated value from the SMBIOS database, and based on its enumerated value, displays the text associated with the value as stored in the template file.

Similar to enumerated values, the SMBIOS database may also include groups of bits that collectively represent some setting of the computing system. As with enumerated values, the template file includes a descriptor key GROUPED_BIT_FIELD_ID having different text to be printed based on the settings of the grouped bits.

As mentioned, the template file of the present invention includes a descriptor key for describing a bit field, (i.e., BIT_FIELD_ID). In some instances, not all of the bits in an N bit field will be defined. For example, if the bit field includes 64 bits, a smaller number of these bits may be defined, while others are reserved. In this instance, so that the utility program does not needlessly process these undefined bits and the template file is not required to store information for undefined bits, the template file includes a descriptor key END_OF_BIT_FIELD indicating to the utility program the last defined bit position in the bit field.

In a similar manner, an enumerated value having N possible values may have less than all N possible values defined. In this instance, the template file again includes a descriptor key END_OF_ENUM_ID indicating to the utility program a last defined data value, such that the template file does not include and the utility does not search for undefined values in the template file.

As mentioned, the template file may include data in the form of groups of bits that collectively define a data value, (GROUPED_BIT_FIELD_ID). For example, in a grouped bit field with M total bits a group of N bits may define $2^N$ values because each bit can be set to either a 1 or a 0. The number of bits in the group N may be less than or equal to the total number of bits allocated (M) to the grouped bit field, and if less, other groups may be defined until all bits are used. In some embodiments, the group of bits may not have defined values for all $2^N$ possible values. In this instance, the template file may further include a data descriptor key referred to as GBF_END_GROUP indicating to the utility program a last defined value for the group of bits such that the utility does not search for undefined bit field group values.

In some instances, the grouped bit field data may not define all of the bits. In this instance, the template file further includes a GBF_END_GROUP descriptor key. This descriptor key indicates the end of the definitions for all bit groups within the grouped bit field data.

In addition to descriptor keys for defining the data structures stored in the SMBIOS database, the template file of the present invention also includes structure definitions that define the structure of the template file itself. Specifically, for each data structure in the SMBIOS database, there is a corresponding structure definition in the template file that includes descriptor keys for defining the structure and text and format information related to the structure of the SMBIOS database. These structure definitions are interpreted by the utility program, which may use process control keys to properly read the data from the template file. For example, one process control key, (i.e., STRUCTURE_HEADER_ID), is used to indicate to the utility program the beginning of a SMBIOS structure definition in the template file and a second process control key is used to indicate the end of the template file, (i.e.,. ENDOF_STRUCTURES). The STRUCTURE_HEADER_ID control key is used at the beginning of the definitions of each SMBIOS structure Type. Importantly, data following the STRUCTURE_HEADER_ID key may include control flags indicating which fields of the information stored for the Type is editable by the user, allowing the user to edit some of this information.

In some instances, one or more of the Fields in the structure definition may be repeated. Control keys SET_REPEAT_START_ID and SET_REPEAT_END_ID respectively mark the beginning and ending locations of repeated fields. In addition, the template file includes control keys SET_REPEAT_COUNT_ID and SET_REPEAT_SIZE_ID to respectively determine the number of times a group of fields in a structure definition is repeated and the size of the repeated area in bytes.

As mentioned the SMBIOS database typically includes a large amount of data concerning the computing system. For example, currently SMBIOS includes Types 00–127, which concern various hardware and software components of the system. In some instances, however, an original equipment manufacture OEM may wish to include information concerning specific additional features of their computing systems. To this end, the present invention provides an OEM template file that includes information for interpreting and displaying the additional OEM specific data structures stored in the SMBIOS database with Types greater than or equal to 128. The information stored in the OEM template file uses the same descriptor and control keys used in the main template file discussed above.

BRIEF DESCRIPTION OF THE DRAWINGS

Figure 1:
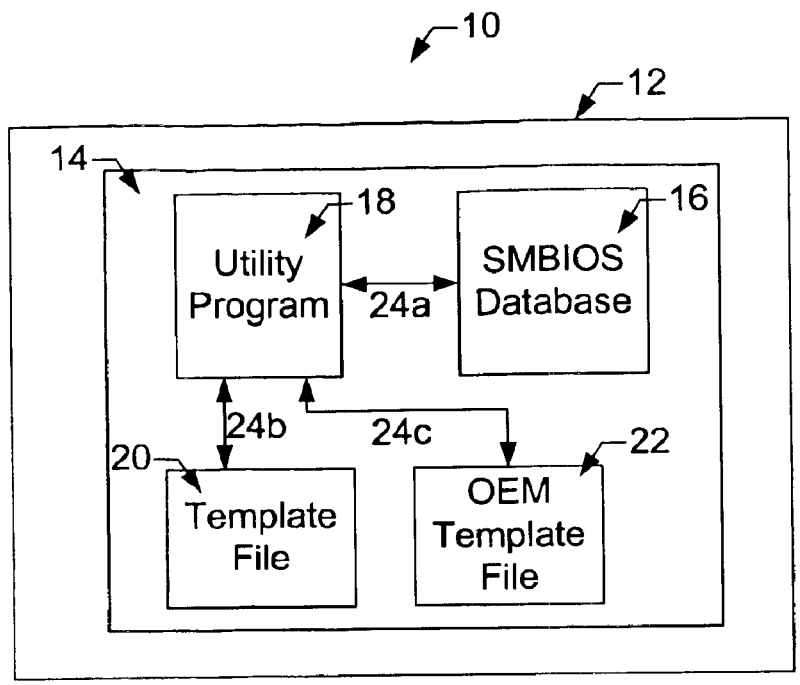

Having thus described the invention in general terms, reference will now be made to the accompanying drawings, which are not necessarily drawn to scale, and wherein:

FIG. 1 is an operational block diagram illustrating the use of the template file by a utility program to interpret and display data retrieved from a SMBIOS database, according to one embodiment of the present invention.

Figure 2:
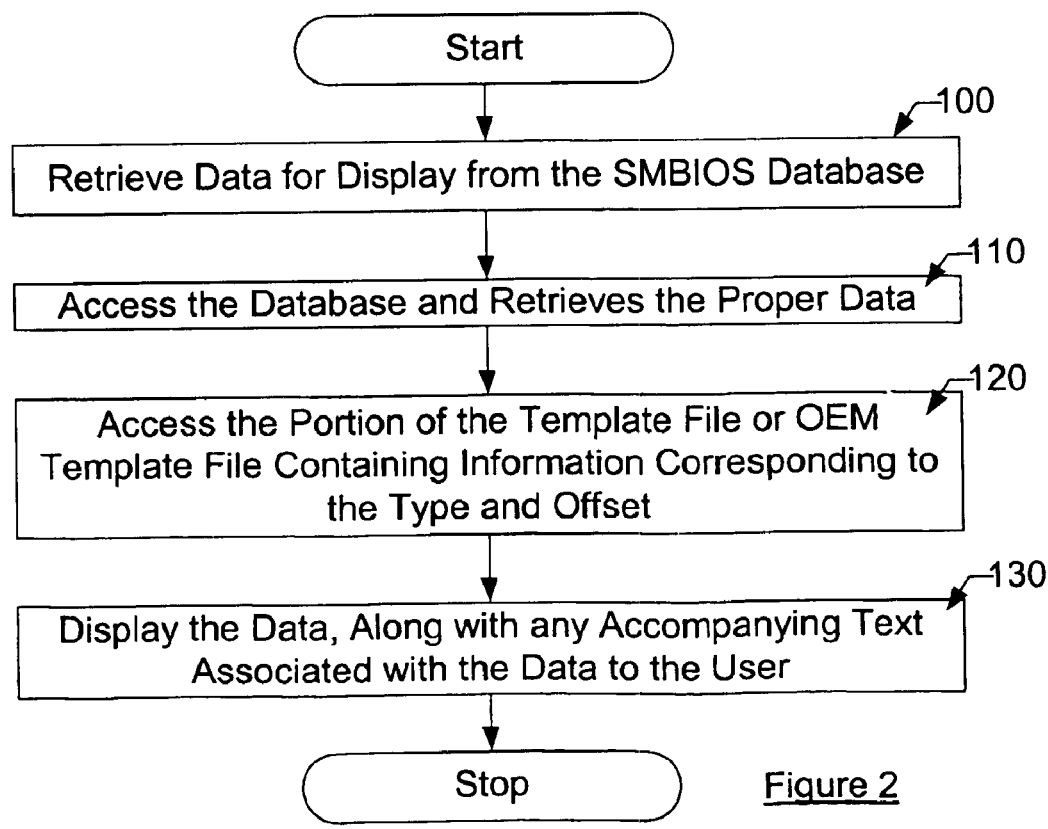

FIG. 2 is an operational block diagram illustrating the steps performed by the utility program using the template file to interpret and display data retrieved from a SMBIOS database, according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As discussed above and provided in more detail below, the present invention provides apparatus and methods for managing the display of data stored in data structures in a SMBIOS database. The apparatus and methods of the present invention provide a template file intermediate between the utility program and database of SMBIOS information. The template file includes all information required for interpreting and displaying the data structures stored in the SMBIOS database. In this regard, when the utility is commanded to retrieve and display data from the SMBIOS database, it retrieves the data from the SMBIOS database. Based on the Type and offset associated with the data currently being processed, the utility program accesses the corresponding information for interpreting and displaying the data from the template file. Using this information, the utility program then properly interprets and the displays the requested information concerning the computing system.

Importantly, because the information for interpreting and displaying the data stored in the SMBIOS database is removed from the source code of the utility program and placed in the template file, updates to this information is performed in the template file, as opposed to the utility program. Thus, as the SMBIOS database is updated to new major and minor versions, the utility program does not require updating. Instead all updates are performed in the template file and new versions of the template file are created. In this regard, the utility program and all versions of the template file may be stored in the computing system. The utility program will determine the version of the SMBIOS database resident in the computing system and select the corresponding template file version to interpret and display data stored in the SMBIOS database. As such, all of the computing systems within a network will use the same version of the utility program, but their utility programs will individually select the proper version of the template file to use with the corresponding version of the SMBIOS database.

In some embodiments, the apparatus of the present invention may also include an OEM template file that uses the same descriptor and control keys used in the template file. The OEM template file that includes information for interpreting and displaying additional OEM specific data structures stored in the SMBIOS database.

The apparatus and methods of the present invention are used in a computing environment to provide detailed information concerning the hardware and software components of the computing system, as well as various settings. The apparatus of the present invention includes three and sometimes four separate portions that collectively perform these functions. These portions are typically embodied in program code stored in a storage device of the computer and are run by a processor. With reference to FIG. 1, the computing system 12 in which the apparatus 10 of the present invention is incorporated includes a computer-readable medium typically embodied in a storage device 14. The computer readable medium includes an SMBIOS database 16 that includes various data structures providing information concerning the various hardware and software components of the computing system. The apparatus of the present invention also includes a utility program 18 for retrieving and displaying information from the SMBIOS database based on commands from a user of the computing system.

Importantly, the apparatus of the present invention also includes a template file 20 intermediary between the utility program and SMBIOS database. As will be described in greater detail below, the template file includes information for interpreting the data structures stored in the SMBIOS database, as well as information for formatting the data and text to display with the data. In some embodiments, the apparatus may further include an original equipment manufacturer (OEM) template file 22 containing data for interpreting and displaying data structures added to the SMBIOS database by the OEM computing system.

As shown by data flow arrows, 24a–24c, and the operations in FIG. 2, the utility program is first commanded to retrieve data for display from the SMBIOS database 16. (See step 100). Based on this command, the utility accesses the database and retrieves the proper data. (See step 110). This data may be in one of several structured forms. Specifically, the data may be a raw data value, a string, a bit field, etc. To properly interpret the data structure, the utility program, using the Type and offset of the data as stored in the database, accesses the portion of the template file or OEM template file containing information corresponding to the Type and offset. (See step 120). Using the information stored in the template file, the utility program determines the information in the data structure and any formatting for displaying the data. (See step 130). The utility program then displays the data, along with any accompanying text associated with the data to a display of the computing system and awaits a new command. (See step 140). Note that the template file includes structure definitions for Types 000–127 and the OEM template file include structure definitions for Types 128–255. Based on the Type associated with the data retrieved from the SMBIOS database, the utility program will access the appropriate template file.

As illustrated in FIG. 1, the present invention provides several advantages over conventional SMBIOS systems. Specifically, all of the information for interpreting and displaying data stored in data structures of the SMBIOS database is removed from the source code of the utility program and placed in a separate template file. In this way, the data may be easily updated by merely updating the template file, as opposed to revising the utility program. Further, and importantly, because all revisions are made to the template file, a common utility program may be used for various versions of the SMBIOS database. In this regard, all possible versions of the template file corresponding to all versions of the SMBIOS database may be stored along with the utility program in the storage device of the computing system. The utility program will access the SMBIOS database in the system and determine its version. The utility program will then select the corresponding version of the template file for interpreting and displaying the data it retrieves from the SMBIOS database.

The discussion below make reference to a utility program used for retrieving and displaying data from the SMBIOS database. It further discusses interaction of the utility program with the template and OEM template file. An example of a utility program for this purpose has been developed by American Megatrends, Inc. (AMI) who is the assignee of the present application. This program is referred to in the market as SMBINFO™ and is commercially available through AMI. The SMBINFO utility program is specifically designed to operate in conjunction with the template and OEM template files to retrieve and display information stored in the SMBIOS database.

Described in detail below is the use of different descriptor and control keys in the construction of the template file and OEM template file. These keys are used to describe the various data structures stored in the SMBIOS database and provide format and text information for display of the data. The creation of data for each structure Type and field of the SMBIOS database is not illustrated below for sake of brevity. Instead, demonstrations of the use of each of the descriptor and control keys with selected data structures in the SMBIOS database will instruct one skilled in the art in creating the entire template file.

As discussed above, the SMBIOS database includes various data stored in different data structure Types defining various hardware and software settings of the computing system. The details concerning SMBIOS in general and the specifics concerning the utility program and SMBIOS database are disclosed in "System Management BIOS Reference Specification," version 2.3 (Aug. 12, 1998) authored by American Megatrends, Inc. et al. (hereinafter "SMBIOS Specification"). The contents of this document are incorporated herein by reference. With regard to the SMBIOS Specification, the SMBIOS database includes data structures separated into 128 Types that include data concerning everything from the system BIOS used by the computing device, the processor, memory, chassis, ports, slots, etc, of the computing system. Within each structure Type there is various data related to the subject of the Type designated by data Fields.

For example, a Type 0 structure includes data related to the BIOS of the computing system. Stored in this structure is information concerning the vendor of the BIOS, the version of BIOS, BIOS starting address, BIOS characteristics, etc. Each piece of information is stored within the structure in different Fields. Further, each Field may be stored as different data types. Specifically, the vendor's name and BIOS version are stored as strings in the database, while BIOS characteristics, which indicates all the various characteristics of the BIOS, is stored as a bit field. For each structure Type and each of its Fields, the template file of the present invention includes data descriptor keys and information for interpreting and displaying the information. The structure of the template file and OEM template file is described below.

There are two main parts of the template file 20: the Main header and the data body. Note that the OEM template does not include a Main header; it only includes the data body portion. The Main header is organized as shown in Table 1:

TABLE 1

Main Template File Header

| Offset | Size | Type | Description |
|---|---|---|---|
| 00 | dd | Signature | SMBIOS Data Signature (4 bytes) |
| 04 | dd | Version | DWORD version |
| 08 | db | Control Flag | Control Flag (1 byte) Bit 0: 0-editable fields displayed Bit 1: editable fields enabled |
| 09 | db | Checksum | 8 bit checksum byte |

It includes information concerning the version, editable fields within the template file, and a checksum.

Following the header, is the body of the template file. The OEM template file includes only the body and not the Main header. The body of the template file includes structure definitions for Types 000–127 and the OEM template file may include structure definitions for Types 128–255. The body includes all of the information for interpreting and displaying each Field of each data structure stored in the SMBIOS database. Specifically, for each Field of each data structure type in SMBIOS, there is a corresponding Field definition in the template file for interpreting and displaying that field. Each structure definition in the template file is preceded by its own structure header that contains information about the structure's type, its title, which offsets are editable in the structure, and a pointer to the start of the descriptor keys. The structure definition header is organized as shown in Table 2:

TABLE 2

Template Structure Header

| Offset | Size | Type | Description |
|---|---|---|---|
| 00 | dw | Structure Header ID | Special processing key that identifies the start of a new structure definition |
| 02 | db | Type | Type of SMBIOS structure |
| 03 | dw | Pointer to Title | Offset to the structure's title string |
| 05 | dw | Pointer to Editable Offset List | Offset to a null terminated list of editable offsets in the structure |
| 07 | dw | Pointer to the Start of Data | Offset to the Start of the Structure Definition Data |

Following the structure header is the information for interpreting and displaying the data structures of the SMBIOS database. This information is typically in the form of descriptor keys for describing the data structure and control keys, which are used to navigate the structure definition. The data descriptor keys and control keys are listed below in Tables 3 and 4:

TABLE 3

Descriptor Keys

| Key | Description |
| --- | --- |
| DATA_ID | used to describe all types of raw data |
| STRING_ID | used to describe strings |
| BIT_FIELD_ID | used to describe bit values and their settings |
| ENUM_ID | used to describe enumerated values and their settings |
| GROUPED_BIT_FIELD_ID | used to describe groups of bits that exist within a larger data type |
| FREEFORM_STRINGS_ID | used to describe free-form string data |

TABLE 4

Control Keys

| Key | Description |
| --- | --- |
| STRUCTURE_HEADER_ID | used to mark the start of a new SMBIOS structure definition |
| ENDOF_STRUCTURES | used to mark the end of the template file |
| SET_REPEAT_COUNT_ID | used to indicate that the utility program needs to calculate the number of times a group of fields are to be repeated |
| SET_REPEAT_SIZE | used to indicate that the utility program needs to calculate the total size of the group of fields that are repeated |
| SET_REPEAT_START_ID | used to mark the starting location for a group of repeated fields |
| SET_REPEAT_END_ID | used to mark the ending location for a group of repeated fields |

Each of the descriptor keys and control keys is described below. The description below is used to illustrate how these keys may be used to construct individual structure definitions for each offset of each Type data structure stored in the SMBIOS database. The keys are described in conjunction with specific data structures from the SMBIOS database to provide examples of their use. These examples can be used to construct structure definitions for the remaining data of the SMBIOS database. For example, below is illustrated use of the DATA_ID descriptor key to create a structure definition for a data value stored in the SMBIOS database indicating the speed of an internal clock. This example can be used to create structure definitions in the template file and OEM template file for all other data values stored in the SMBIOS database.

I. Data Descriptor Keys

Each data descriptor key is described below. For each key, the following information is provided: a description of the key, the encoded value designating the key, any sub-keys, and an example of use of the key.

A. DATA_ID

The DATA_ID descriptor key is used for fields that consist of some raw data value. Examples of raw data stored in the SMBIOS database include memory speed, processor clock, handle numbers, etc. As many raw data values are given in terms of a unit value, the DATA_ID key also includes text to be printed with the raw data indicating the units of the value, such as "Mhz," "ns," "hex," etc.

| Encoded Value: | 0xFFF0 |
| --- | --- |

Format

The format for the DATA_ID descriptor key includes a field title describing the data, length of the data in bytes, format of the data, text to be printed with the data, and a field description.

| | |
| --- | --- |
| dw | DATA_ID |
| db | Null terminated string for field title |
| db | Length of data field in bytes |
| db | Format ID |
| db | Null terminated string which follows the printed numeric data value |
| db | Null terminated string for field description |

Notes:
The Format ID is a special indicator flag that specifies how the data is to be printed. It may also be used in cases where the data needs to have some formula applied to it to derive a meaningful value to display to the user. If a formula is used, the formula is typically coded in the utility program. Table 5 lists the current codes for the format of the data. It must be understood that additional formats could be created depending on the type of raw data to be retrieved and displayed.

TABLE 5

| Format Code | Encoded Value | Notes |
| --- | --- | --- |
| FORMAT_SEE_DETAILS | 0 | Prints a message for the user to see a details window for more information |
| FORMAT_HEX | 1 | Prints the data in hexadecimal |
| FORMAT_DECIMAL | 2 | Prints the data in decimal |
| FORMAT_BIOS_ROMSIZE | 3 | Prints the data according to the formula 64k * (n + 1). |
| FORMAT_2_TO_N | 4 | Prints the data according to the formula 2^n. Used for memory size. |
| FORMAT_EXTENDED_DATA | 5 | Format used for extra data that may exist which has no specific (or known) definition. An example would be any undefined extension bytes at the end of Type 0 or the variable SMBIOS specification). Extended data is generally used within a repeat loop, therefore, when encountering this key type the utility program prints "Extended Value Data Number:" followed by the current iteration of the loop. |
| FORMAT_MEMORY_CAPACITY | 6 | Prints "Unknown Capacity" the value is 8000000h, or the value in kB. |

ASSEMBLER EXAMPLE

Below is an example of the Field definition for the speed of the external clock, which is Type 4, offset 12h in the SMBIOS database.

```
dw  DATA_ID                              ; Data identifier
db  "External Clock",0                    ; Field description
db  02h                                   ; Length of data in bytes
db  FORMAT_DECIMAL                        ; Printed data format
db  "Mhz",0                               ; Any text to follow data
db  "Clock frequency of the external clock  ; Field description
    (in Mhz)",0
```

B. STRING_ID

The STRING_ID descriptor key is used for fields that consist of strings and informs the utility program that this offset represents the number of a string stored in the SMBIOS database.

| Encoded Value: | 0xFFF1 |
|---|---|

Format

The format for the STRING_ID descriptor key includes a field title describing the data, text to be printed with the data, and field description.

```
dw  STRING_ID
db  Null terminated string for field title
db  Null terminated string for field description
```

ASSEMBLER EXAMPLE

Below is an example of the structure definition for the vendor name of the BIOS software used in the computing system, which is Type 0, offset 04h in the SMBIOS database.

```
dw  STRING_ID                          ; String identifier
db  "BIOS Vendor's Name",0             ; Field description
db  "String indicating the name        ; Field description
    of the BIOS vendor",0
```

C. BIT_FIELD_ID and ENDOF_BIT_FIELD_ID

These descriptor keys define a bit field. A bit field is a data value whose individual bits represent one of two possible states. The BIT_FIELD_ID key begins description of each bit in the field and provides appropriate text to be printed based on whether the individual bits are 1 or 0. The ENDOF_BIT_FIELD_ID key indicates the end of the bit definitions, so that not all bits within the bit field have to be defined in the template file. For example, if the byte size is 2, but bits 11–15 are reserved or undefined, their definitions can be left out of the template file.

| Encoded Value: | |
|---|---|
| BIT_FIELD_ID | 0xFFF2 |
| ENDOF_BIT_FIELD_ID | 0xFFF3 |

Format

The format for the BIT_FIELD_ID descriptor key includes a field title describing the data, size in bytes of the bit field data value, text to display based on whether the bits are a 1 or a 0, the number of each bit in the bit field and a description for each bit.

```
dw  BIT_FIELD_ID
db  Null terminated string for field title
db  Size in bytes of the bit field data value
db  Null terminated string to use when bit = 0
db  Null terminated string to use when bit = 1
db  xx - Bit Field bit number
db  Null terminated string describing the previous bit number
... repeat this section until all bits are defined ...
dw  ENDOF_BIT_FIELD_ID
```

ASSEMBLER EXAMPLE

Below is an example of use of these keys to create a structure definition for the bit field stored in the SMBIOS database describing the error correcting capabilities of the memory controller of the computing system. This information is Type 5, offset 05h in the SMBIOS database. The bit field for this information consists of six (6) bits, where each bit defines an error correcting capability based on whether the bit is set to 1 or 0. The meaning of each bit is provided in Table 6.

TABLE 6

| Byte Bit Position | Meaning |
|---|---|
| Bit 0 | Other |
| Bit 1 | Unknown |
| Bit 2 | None |
| Bit 3 | Single Bit Error Correcting |
| Bit 4 | Double Bit Error Correcting |
| Bit 5 | Error Scrubbing |

```
dw  BIT_FIELD_ID                        ; Data identifier
db  "Error Correcting Capability",0     ; Field description
db  1                                   ; Bytes used for bit-field
db  "No",0                              ; String to use when bit = 0
db  "Yes",0                             ; String to use when bit = 1
; Begin bit field encoding for this value
db  00h, "Other",0
db  01h, "Unknown",0
db  02h, "None",0
db  03h, "Single Bit Error Correcting",0
db  04h, "Double Bit Error Correcting",0
db  05h, "Error Scrubbing",0
dw  ENDOF_BIT_FIELD_ID
```

As illustrated, the remaining two bits of the bit field are not defined, and as such, the ENDOF_BIT_FIELD_ID key is used to end the structure definition, such that the remaining two bits do have to be defined in the template file.

D. ENUM_ID and ENDOF_ENUM_ID

This key defines an enumerated value, meaning that the field's numerical value represents some type of defined setting. Enumerated values are always one byte.

```
Encoded Value:
ENUM_ID              0xFFF4
ENDOF_ENUM_ID        0xFFF5
Format:
    dw   ENUM_ID
┌─► db   Null terminated string for field title
│   db   xx - Enumerated value setting
│   db   Null terminated string describing the previous enumerated value
└─  ... repeat this section until all values are defined ...
    dw   ENDOF_ENUM_ID
```

Notes:
The ENDOF_ENUM_ID key indicates the end of the enumerated values so that undefined values do not have to be defined in the template file. For example, an enumerated value stored in the SMBIOS database is on byte long or 8 bits. That means that there are $2^8$ possible values. If less than all values are currently defined, the ENDOF_ENUM_ID may be used after the last defined value.

ASSEMBLER DATA EXAMPLE

Illustrated below is the structure definition for data related to the processor type, which is Type 4, offset 05h. The enumerated value for the offset has 6 possible values, with each value of the enumerated value indicating a different type of processor. Table 7 provides the processor designation for each byte value of the enumerate value.

TABLE 7

| Byte Value | Meaning |
|---|---|
| 01h | Other |
| 02h | Unknown |
| 03h | Central Processor |
| 04h | Math Processor |
| 05h | DSP Processor |
| 06h | Video Processor |

```
dw   ENUM_ID               ; Data identifier
db   "Processor Type",0    ; Field Description
db   01h, "Other",0
db   02h, "Unknown",0
db   03h, "Central Processor",0
db   04h, "Math Processor",0
db   05h, "DSP Processor",0
db   06h, "Video Processor",0
dw   ENDOF_ENUM_ID
```

E. GROUPED_BIT_FIELD_ID, GBF_END_GROUP, and ENDOF_GROUPED_BIT_FIELD_ID

These descriptor keys define a grouped bit field. A grouped bit field differs from a normal bit field in that the groups of bits collectively represent some sort of setting of the computing system similar to an enumerated value. For example, a grouped bit field having a size of 1 byte may have bits 0–2 representing 8 different settings based on their value, while bits 3 and 4 represent 4 other settings, etc. In this instance, the GROUPED_BIT_FIELD_ID descriptor key represents the beginning of the grouped bit field. The GBF_END_GROUP descriptor key indicates the end of the definitions for each group within the grouped bit field. Similar to an enumerated value, each group within the grouped bit field contains description strings for each possible value of the bit group. Finally, since the number of possible values per group is defined as $2^n$ (where n is the number of bits in the group), all possible values may not be defined. As such, the ENDOF_GROUPED_BIT_FIELD_ID indicates the end of the grouped bit definitions, so that undefined groups of bits do not have to be defined in the template file. For example, if the byte size is 1, but only one bit group from bits 3:0 is defined, the remaining bit groups do not have to be defined in the template file.

```
Encoded Value:
GROUPED_BIT_FIELD_ID         0xFFF6
GBF_END_GROUP                0xFFF7
ENPOF_GROUPED_BIT_HELD_ID    0xFFF8
```

```
Encoded Value:
GROUPED_BIT_FIELD_ID         0xFFF6
GBF_END_GROUP                0xFFF7
ENDOF_GROUPED_BIT_FIELD_ID   0xFFF8
Format
    dw   GROUPED_BIT_FIELD_ID
    db   Null terminated string for field title
    db   Number of bytes occupied by the grouped bit field
┌─► (Begin bit field group encoding)
│   db   Group start bit
│   db   Group end bit
│   db   Null terminated string of group description
│┌► db   Bit group value
││  db   Null terminated string describing the above value
│└  ... repeat this section for each possible value in the group ...
│   db   GBF_END_GROUP
└─  ... repeat this section for all groups ...
    dw   ENDOF_GROUPED_BIT_FIELD_ID
```

ASSEMBLER EXAMPLE

The following is an example of the structure definition related to CPU status information concerning the CPU of the computing system. This structure definition is Type 4, offset 18h in the SMBIOS database and includes two grouped bit fields as a subset of a larger data structure, with bit 6 being a one bit grouped field and bits 2:0 representing the other grouped bit field. Specifically, bit 7 and bits 5:3 are reserved, while bit 6 is a first grouped bit field and bits 2:0 is a second grouped bit field. This is illustrated in Table 8.

TABLE 8

| Bits | Description |
|---|---|
| 7 | Reserved, must be 0 |
| 6 | CPU Socket Populated<br>1 - CPU Socket Populated<br>2 - CPU Socket Unpopulated |
| 5:3 | Reserved, must be 0 |
| 2:0 | CPU Status<br>0h - Unknown<br>1h - CPU Enabled<br>2h - CPU Disabled by User via BIOS Setup<br>3h - CPU Disabled by BIOS (Post Error)<br>4h - CPU is Idle, waiting to be enabled<br>5–6h - Reserved<br>7h - Other |

```
dw   GROUPED_BIT_FIELD_ID              ; Data identifier
db   "Status",0                         ; Field Description
db   1                                  ; Number of bytes occupied
; begin bit field encoding for this value
db   6,6                                ; First group (start, end) bits
db   "CPU Socket Populated,"0           ; Group title
db   00h, "No",0                        ; Group values . . .
db   01h, "Yes",0
dw   GBF_END_GROUP                      ; Signal end of this group
db   2,0                                ; Next group (start, end) bits
db   "CPU Status,"0                     ; Group title
db   00h, "Unknown",0                   ; Group values . . .
db   01h, "CPU Enabled",0
db   02h , "CPU Disabled by User (via setup)",0
db   03h. "CPU Disabled by BIOS (Post Error)",0
db   04h. "CPU is Idle (waiting to be enabled)",0
db   07h. "Other",0
dw   GBF_END_GROUP                      ; Signal end of this group
dw   ENDOF_GROUPED_BIT_FIELD_ID         ; Signal end of grouped bit field
```

F. FREEFORM_STRINGS_ID

The FREEFORM_STRING_ID descriptor key is used to indicate that the field is a count for free-form strings at the end of the structure, such as Type 11 (OEM Strings) or Type 12 (System Configuration Options).

| Encoded Value: | 0xFFF9 |
| --- | --- |
| Format | |
| dw | FREEFORM_STRINGS_ID |
| db | Null terminated string describing the above value |

Notes:
Currently, there are only two structure types that use the FREEFORM_STRINGS_ID descriptor key, and essentially this key is the only entry in their structure definitions. When the utility program encounters this key, it knows that this byte offset within the SMBIOS structure represents the number of free-form strings.

ASSEMBLER EXAMPLE

| Assembler Example: | |
| --- | --- |
| dw | FREEFORM_STRINGS_ID |
| db | "Free-form strings: OEM Strings",0 |

II. Process Control Keys

Each process control key is described below. For each key, the following information is provided: a description of the key, the encoded value designating the key, any sub-keys, and an example of use of the key. These keys are used to direct the utility program when retrieving information from structure definitions stored in the template file.

A. STRUCTURE_HEADER_ID

The STRUCTURE_HEADER_ID is a control key used to indicate the beginning of a structure definition. This key is used to indicate when the data begins and ends. For example, at the beginning of the structure definition in the template file, the STRUCTURE_HEADER_ID is used to designate the beginning of the structure definition.

| Encoded Value: | 0xFFE0 |
| --- | --- |
| Format | |
| dw | STRUCUTRE_HEADER_ID |
| (followed by structure header data, i.e., Type, Pointer to Title, etc.) | |

ASSEMBLER EXAMPLE

The following example illustrates the beginning portion of the structure definition in the template file for Type 0 SMBIOS database structures.

```
;--------------------------------------------------;
;Type 0 Structure Definition
;--------------------------------------------------;
dw      STRUCTURE_HEADER_ID              ; Start of structure identifier
BIOS_INFOstart:
db      BIOS_INFO                         ; TYPE
dw      offset BIOS_INFOstring-offset BIOS_INFOstart
dw      offset BIOS_INFOfields-offset BIOS_INFOstart
dw      offset BIOS_INFOdata-offset BIOS_INFOstart
BIOS_INFOstring:
db      "BIOS Information",0              ; Title string
BIOS_INFOfields:
db      05h, 08h, 09h, 00h;    ;Editable field offsets inside fixed header
BIOS_INFOdata:
```

```
;--------------------------------------------------;
dw      STRING_ID                           ; STRING identifier
db      "BIOS Vendor's Name",0              ; Field Description
db      "String indicating the name of the BIOS vendor.",0 ; Field Description
```

B. ENDOF_STRUCUTRES

The ENDOF_STRUCUTRES key is a control key used to indicate the end of the template file.

```
Encoded Value:    0xFFE1
Format:
dw                ENDOF_STRUCTURES
```

ASSEMBLER EXAMPLE

At the very end of the template file the following is placed:

```
;--------------------------------------------------;
dw    ENDOF_STRUCTURES
```

C. SET_REPEAT_COUNT_ID

This control key is used to indicate the beginning of a repeating loop in the structure definition. When encountering this key, the utility program uses the value following the key (Repeat Type) to know how to determine the repeat count.

```
Encoded Value:    0xFFE2
Format:
dw      SET_REPEAT_COUNT_ID
dw      Repeat count type
db      Size of repeated section in bytes (RepeatSize)
db      Number of non-repeating bytes that follow the
        repeated block
```

Repeat Count Types:
0: GET_COUNT_FROM_FOLLOWING_OFFSET
1: GET_COUNT_FROM_LENGTH

Notes:

1. If Repeat Count is of the type GET_COUNT_FROM_FOLLOWING_OFFSET, then the utility program gets the explicit count from the next offset in the SMBIOS structure.
2. If Repeat Count is of the type GET_COUNT_FROM_LENGTH_the utility program determines the count based on the overall length of the structure and the size of the repeat block.
3. If the utility program has processed a SET_REPEAT_SIZE_ID, then that size will be used in the count calculation.
4. If the utility program has not encountered a SET_REPEAT_SIZE_ID key, then the repeat size will be determined from the 'RepeatSize' value in the Format header.
5. If RepeatSize is set to 0, then the SET_REPEAT_SIZE_ID key must be used before beginning the loop.

The count calculation for GET_COUNT_FROM_LENGTH is as follows:

$$\frac{\text{(Structure Length} - \text{Current offset in the structure} - \text{Number of non-repeating bytes)}}{RepeatSize}$$

ASSEMBLER EXAMPLE

This section of code is from Memory Controller Information, Type 5, offset 0Fh. A listing of the Type 5 structure is illustrated in Table 9, (offsets 00h–0Dh are not illustrated). Note that the number of non-repeating bytes is 1 because of the bit field following the Memory Module Configuration Handle repeat block.

TABLE 9

| Offset | Name | Length | Value | Description |
|---|---|---|---|---|
| 0Eh | Number of Associated Memory Slots (x) | BYTE | Varies | Defines how many of the Memory Module Information blocks are controlled by this controller |
| 0Fh to (0Fh + (2*x) − 1) | Memory Module Configuration Handles | x WORD | Varies | A list of memory information structure handles controlled by this controller. Value in offset 0Eh (x) defines the count |
| 0Fh +(2*x) | Enabled Error Correcting Capabilities | BYTE | Bit Field | Identifies the error-correcting capabilities that were enabled when the structure was built. |

In this instance, the offset 0Eh provides the number of times the looped information will be repeated. Below illustrates use of the GET_COUNT_FROM_FOLLOWING_OFFSET to get the count from the offset 0Eh and use of the SET_REPEAT_COUNT_ID, SET_REPEAT_START_ID, and SET_REPEAT_END_ID keys.

```
..
..
..
dw    SET_REPEAT_COUNT_ID          ; Set REPEAT identifier.
db    GET_COUNT_FROM_FOLLOWING_OFFSET; Get repeat count from
                                                next offset
db    2                             ; Size of repeated section in bytes
db    1                             ; Number of non-repeating bytes
dw    DATA_ID                       ; Data identifier
db    "Number of Associated Memory Slots",0 ; Field Description
db    01h                           ; Length of data
db    FORMAT_DECIMAL                ; Printed Data format
db    " Slots",0                    ; Any text to follow data
db    "Number of memory module slots controlled by this controller",0
; --------Repeating block start
      dw       SET_REPEAT_START_ID
      dw       DATA_ID               ; Data identifier
      db       "Memory Module Configuration Handle",0 ; Field Description
      db       02h                   ; Length of data
      db       FORMAT_HEX            ; Printed Data format
      db       "h",0                 ; Any text to follow data
      db       "Handle of a memory module controlled by this controller",0
      dw       SET_REPEAT_END_ID
; --------Repeating block end
      dw       BIT_FIELD_ID          ; Data identifier
      db       "Enabled Error Correcting Capabilities",0 ; Field Description
      db       1                     ; Bytes used for bit field
      db       "No",0                ; String to use when bit = 0
      db       "Yes?",0              ; String to use when bit = 1
      ; Begin bit field encoding for this value
      db       00h, "Other",0
      db       01h, "Unknown",0
      db       02h, "None",0
      db       03h, "Single Bit Error Correcting",0
      db       04h, "Double Bit Error Correcting",0
      db       05h, "Error Scrubbing",0
      dw       ENDOF_BIT_FIELD_ID
```

D. SET_REPEAT_SIZE_ID

Used to indicate the size of a repeated block of fields in the structure definition when the repeat size is actually specified by a Field value in the structure data, rather than being given in the SET_REPEAT_COUNT_ID information. When encountering this key, the utility program uses the following byte in the SMBIOS structure to know how to determine the repeat count.

| | |
|---|---|
| Encoded Value: | 0xFFE3 |
| Format: | |
| dw | SET_REPEAT_SIZE_ID |

Notes:
1. If the utility program has already processed a SET_REPEAT_COUNT_ID and the repeat block size in the header is nonzero, then the repeat count has already been set and this key will be ignored.
2. If the utility program has NOT encountered a SET_REPEAT_COUNT_ID key, or the repeat block size in the SET_REPEAT_COUNT_ID header is 0, then the byte at this position in the SMBIOS structure will be used as the size and the repeat count will be calculated as follows:

$$\frac{(\text{Structure Length} - \text{Current offset in the structure} - \text{Number of non-repeating bytes})}{(\text{RepeatSize})}$$

whereas "Number of nonrepeating bytes" is set to 0 by default.

ASSEMBLER DATA EXAMPLE

This section of code is from System Event Log Type 15.
A listing of the Type structure is illustrated in Table 10,
(offsets 02h–14h are not illustrated).

TABLE 10

| Offset | Name | Length | Value | Description |
| --- | --- | --- | --- | --- |
| 00h | Type | BYTE | 15 | Event Log Type Indicator |
| 01h | Length | BYTE | Varies | Length of the structure, including the Type and Length fields. The Length is 14h for v2.0 implementations or computed by the BIOS as 17h + (x*y) for v2.1 and higher—where x is the value present at offset 15h and y is the value present at offset 16h |
| ... | ... | ... | ... | ... |
| 15h | Number of Supported Log Type Descriptors (x) | BYTE | Varies | Number of supported even log type descriptors that follow. If the value is 0, the list that starts at offset 17h is not present |
| 16h | Length of each Log Type Descriptor (y) | BYTE | 2 | Identifies the number of bytes associated with each type entry in the list below. The value is currently "hard-coded" as 2, since each entry consists of two bytes. This field's presence allows future additions to the type list. Software that interprets the following list should not assume a list entry's length. |
| 17h to (17h + (x*y)) − 1 | List of Supported Event Log Type Descriptors | Varies | Varies | Contains a list of Event Log Type Descriptors (see 3.3.16.1), so long as the value specified in offset 15h is non-zero. |

Table 11 shows the description for different Event Log values.

TABLE 11

| Value | Description |
| --- | --- |
| 00h | Reserved |
| 01h | Single-bit ECC memory error |
| 02h | Multi-bit ECC memory error |
| 03h | Parity memory error |
| 04h | Bus time-out |
| 05h | I/O Channel Check |
| 06h | Software NMI |
| 07h | POST Memory Resize |
| 08h | POST Error |
| 09h | PCI Parity Error |
| 0Ah | PCI System Error |
| 0Bh | CPU Failure |
| 0Ch | EISA FailSafe Timer time-out |
| 0Dh | Correctable memory log disabled |

TABLE 11-continued

| Value | Description |
| --- | --- |
| 0Eh | Logging disabled for a specific Event Type - too many errors |
| 0Fh | Reserved |
| 10h | System Limit Exceeded (e.g. voltage or temperature threshold exceeded) |
| 11h | CPU Failure Asynchronous hardware timer expired and issued a system reset |
| 12h | System configuration information |
| 13h | Hard-disk information |
| 14h | System reconfigured |
| 15h | Uncorrectable CPU-complex error |
| 16h | Log Area Reset/Cleared |
| 17h | System boot |

```
..
..
..
    dw    SET_REPEAT_COUNT_ID            ; Set REPEAT identifier.
    db    GET_COUNT_FROM_FOLLOWING_OFFSET ;Get repeat count from
                                                    next key
    db    0                              ; Size of repeated section in bytes
    db    0                              ; Number of non-repeating bytes
    dw    DATA_ID                        ; Data identifier
    db    "Number of Supported Log Type Descriptors",0 ; Field Description
    db    01h                            ; Length of data
```

-continued

```
db    FORMAT_DECIMAL            ; Printed Data format
db    " Descriptors",0           ; Any text to follow data
db    "Number of the supported event log type descriptors that follow.",0
dw    SET_REPEAT_SIZE_ID
dw    DATA_ID                    ; Data identifier
db    "Length of each Log Type Descriptor",0 ; Field Description
db    01h                        ; Length of data
db    FORMAT_DECIMAL             ; Printed Data format
db    " Bytes",0                 ; Any text to follow data
db    "Identifies the number of bytes associated with each type entry.",0
; --------Repeating block start
dw    SET_REPEAT_START_ID
dw    ENUM_ID
db    "Log Type",0
db    00h, "Reserved.",0
db    01h, "Single-bit ECC memory error",0
db    02h, "Multi-bit ECC memory error",0
db    03h, "Parity memory error",0
db    04h, "Bus time-out",0
db    05h, "I/O Channel Check",0
db    06h, "Software NMI",0
db    07h, "POST Memory Resize",0
db    08h, "POST Error",0
db    09h, "PCI Parity Error",0
db    0Ah, "PCI System Error",0
db    0Bh, "CPU Failure",0
db    0Ch, "EISA FailSafe Timer time-out",0
db    0Dh, "Correctable memory log disabled",0
db    0Eh, "Logging disabled for a specific Event Type - too many errors ",0
db    0Fh, "Reserved",0
db    10h, "System Limit Exceeded (e.g. voltage or temperature threshold
                                  exceeded).",0
db    11h, "Asynchronous hardware timer expired and issued a system reset.",0
db    12h, "System configuration information",0
db    13h, "Hard-disk information",0
db    14h, "System reconfigured",0
db    15h, "Uncorrectable CPU-complex error",0
db    16h, "Log Area Reset/Cleared",0
db    17h, "System boot",0
dw    ENDOF_ENUM_ID
dw    ENUM_ID
db    "Variable Data Format Type",0
db    00h,"None",0
db    01h,"Handle",0
db    02h,"Multiple-Event",0
db    03h,"Multiple-Event Handle",0
db    04h,"POST Results Bitmap",0
db    05h,"System Management Type",0
db    06h,"Multiple-Event System Management Type",0
dw    ENDOF_ENUM_ID
dw    SET_REPEAT_END_ID
; --------Repeating block end
```

E. SET_REPEAT_START_ID and SET_REPEAT_END_ID

These keys are used to indicate the start and ending fields in a repeat loop. When the utility program finds a SET_REPEAT_START_ID key, it will mark the offset within the SMBIOS structure and return to it when it encounters a SET_REPEAT_END_ID until the repeat count is exhausted.

Encoded Value:

| | |
|---|---|
| SET_REPEAT_START_ID | 0xFFE4 |
| SET_REPEAT_END_ID | 0xFFE5 |
| Format: | |
| dw | SET_REPEAT_START_ID |
| or | |
| dw | SET_REPEAT_END_ID |

ASSEMBLER DATA EXAMPLE

These control keys are illustrated above with regard to SET_REPEAT_COUNT_ID and SET_REPEAT_SIZE_ID.

Many modifications and other embodiments of the invention will come to mind to one skilled in the art to which this invention pertains having the benefit of the teachings presented in the foregoing descriptions and the associated drawings. Although specific terms are employed herein, they are used in a generic and descriptive sense only and not for purposes of limitation.

That which is claimed:

1. A system management apparatus for retrieving and displaying SMBIOS data relating to the configuration and components of a computing system to a user via a display terminal comprising:

a database of SMBIOS structures stored on a computer-readable medium containing data related to the configuration of the computing system and components of the computing system;

a utility stored on a computer-readable medium, which in response to commands from a user, retrieves data from said database and displays the data on the display terminal; and a template file stored on a computer-readable medium separate from said utility, containing information for interpreting and displaying the SMBIOS data retrieved by said utility from said database, wherein said template file eliminates the requirement that the information for interpreting and displaying the data stored in said database be contained in the utility, wherein said template file includes a data descriptor key for defining multiple groups of bits within a bit field representing a setting of the computing system and components, and wherein a group of bits in the bit field has N bits and can define $2^n$ values, where less than $2^n$ values are defined, and wherein said template file further includes a data descriptor key indicating to said utility a last defined value for each group of bits such that said template file does not include and said utility does not search for undefined bit field group values.

2. An apparatus according to claim 1, wherein said template file further includes data descriptor keys that indicate the type of data retrieved from the database and a format in which it should be displayed.

3. An apparatus according to claim 1, wherein said template file further includes individual data descriptor keys for defining raw data and data strings.

4. An apparatus according to claim 1, wherein said template file further includes a data descriptor key for defining a bit field having individual bits representing information based on whether the bit is a one or a zero.

5. An apparatus according to claim 4, wherein the bit field has N bits where less than N bits of the bit field are defined, and wherein said template file further includes a data descriptor key indicating to said utility the last defined bit position in the bit field such that said template file does not include and said utility does not search for undefined bits of the bit field in the template file.

6. An apparatus according to claim 1, wherein said template file further includes a data descriptor key for defining an enumerated data value, wherein the numerical value of the data represents a defined setting in the computing system and components.

7. An apparatus according to claim 6, wherein the enumerated data has N possible values, and wherein said template file further includes a data descriptor key indicating to said utility a last defined data value such that said template file does nor include and said utility does not search for undefined values in the template file.

8. An apparatus according to claim 1, wherein said template file further includes a data descriptor key for defining a data value representing a count indicating a number of data strings.

9. An apparatus according to claim 1, wherein said template file further includes information in the form of structure definitions used to interpret and display the data stored in said database.

10. An apparatus according to claim 9, wherein said template file includes process control keys used to interpret the structure definitions stored in said template file.

11. An apparatus according to claim 10, wherein said template file includes a process control key indicating a beginning of a SMBIOS structure definition.

12. An apparatus according to claim 10, wherein said template file includes a process control key indicating the end of the template file.

13. An apparatus according to claim 10, wherein said template file includes a process control key indicating to said utility the number of times a group of fields in a structure definition is repeated and the size of the repeated area in bytes.

14. An apparatus according to claim 10, wherein said template file includes process control keys indicating a beginning and ending of a group of repeated fields in a structure definition.

15. An apparatus according to claim 1, further comprising a second template file containing structure definitions for data stored in said database by an original equipment manufacturer.

16. A method for creating a template file for use in interpreting and displaying SMBIOS data relating to the configuration and components of a computing system to a user via a display terminal comprising:

providing a database of SMBIOS structures stored on a computer-readable medium containing data related to the configuration of the computing system and components of the computing system;

providing a utility stored on a computer-readable medium, which in response to commands from a user, retrieves data from the database and displays the data on the display terminal; and creating a template file stored on a computer-readable medium separate from the utility, containing information for interpreting and displaying the data retrieved by the utility from the database, wherein the template file eliminates the requirement that the information for interpreting and displaying the data stored in the database be contained in the utility, wherein said creating step creates a template file that includes a data descriptor key for defining multiple groups of bits within a bit field representing a setting of the computing system and components, and wherein a group of bits in the bit field has N bits and can define $2^N$ values, where less than $2^N$ values are defined, and wherein said creating step creates a template file that further includes a data descriptor key indicating to the utility the last defined value for each group of bits such that said template file does not include and said utility does not search for the undefined bit field group values.

17. A method according to claim 16, wherein said creating step creates a template file that includes data descriptor keys that indicate the type of data retrieved from the database and the format in which it should be displayed.

18. A method according to claim 16, wherein said creating step creates a template file that includes individual data descriptor keys for defining raw data and data strings.

19. A method according to claim 16, wherein said creating step creates a template file that a data descriptor key for defining a bit field having individual bits representing information based an whether the bit is a one or a zero.

20. A method according to claim 19, wherein the bit field has N bits where less than N bits of the bit field are defined, and wherein said creating step creates a template file that further includes a data descriptor key indicating to the utility the last defined bit position in the bit field such that the template file does not include and the utility does not search for undefined bits of the bit field in the template file.

21. A method according to claim 16, wherein said creating step creates a template file that includes a data descriptor key for defining an enumerated data value, wherein the numerical value of the data represents a defined setting in the computing system and components.

22. A method according to claim 21, wherein the enumerated data has N possible values, and wherein said creating step creates a template file that further includes a data descriptor key indicating to the utility the last defined data value such chat the template file does not include and the utility does not search for undefined values in the template file.

23. A method according to claim 16, wherein said creating step creates a template file that includes a data descriptor key for defining a data value representing a count indicating a number of data strings.

24. A method according to claim 16, wherein said creating step creates a template file that includes information in the form of structure definitions used to interpret and display the data stored in the database.

25. A method according to claim 24, wherein said creating step creates a template file that includes process control keys used to intetpret the structure definitions stored in the template file.

26. A method according to claim 25, wherein said creating step creates a template file that includes a process control key indicating a beginning of an SMBIOS structure definition.

27. A method according to claim 25, wherein said creating step creates a template file that includes a process control key indicating the end of the template file.

28. A method according to claim 25, wherein said creating step creates a template file that includes a process control key indicating to the utility that the number of times a group of fields in a structure definition is repeated, and the size of the repeated area in bytes.

29. A method according to claim 25, wherein said creating step creates a template file that includes process control keys indicating a beginning and ending of a group of repeated fields in a structure definition.

30. A method according to claim 16, further comprising the step of creating a second template file containing structure definitions for data stored in said database by original equipment manufacturer.

* * * * *